United States Patent
Macedo

(10) Patent No.: US 11,995,208 B2
(45) Date of Patent: May 28, 2024

(54) UPDATES OF MACHINE LEARNING MODELS BASED ON CONFIDENTIAL DATA

(71) Applicant: Hewlett-Packard Development Company, L.P., Spring, TX (US)

(72) Inventor: Augusto Queiroz de Macedo, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 444 days.

(21) Appl. No.: 17/413,253

(22) PCT Filed: Dec. 12, 2018

(86) PCT No.: PCT/US2018/065255
§ 371 (c)(1),
(2) Date: Jun. 11, 2021

(87) PCT Pub. No.: WO2020/122902
PCT Pub. Date: Jun. 18, 2020

(65) Prior Publication Data
US 2022/0050918 A1    Feb. 17, 2022

(51) Int. Cl.
*H04L 9/00* (2022.01)
*G06F 18/214* (2023.01)
*G06F 21/62* (2013.01)
*G06N 20/00* (2019.01)

(52) U.S. Cl.
CPC ...... *G06F 21/6245* (2013.01); *G06F 18/2148* (2023.01); *G06N 20/00* (2019.01)

(58) Field of Classification Search
CPC .. G06F 21/6245; G06F 18/2148; G06N 20/00
See application file for complete search history.

(56) References Cited

U.S. PATENT DOCUMENTS

| 10,447,688 B1* | 10/2019 | Page ............... H04L 63/083 |
| 2012/0208619 A1* | 8/2012 | Canterbury ......... G06F 21/64 463/25 |
| 2015/0379429 A1 | 12/2015 | Lee et al. |
| 2016/0292025 A1* | 10/2016 | Gupta ............... G06F 3/0688 |
| 2017/0006135 A1* | 1/2017 | Siebel ............... G06Q 10/06 |
| 2017/0032244 A1 | 2/2017 | Kurata |
| 2017/0063910 A1 | 3/2017 | Muddu et al. |

(Continued)

FOREIGN PATENT DOCUMENTS

CN    107040551    8/2017

OTHER PUBLICATIONS

Deep Learning in a Nutshell: Core Concepts (https://developer.nvidia.com/blog/deep-learning-nutshell-core-concepts/) Published: Nov. 3, 2015 (Year: 2015).*

*Primary Examiner* — Daniel B Potratz
*Assistant Examiner* — Syed M Ahsan
(74) *Attorney, Agent, or Firm* — Quarles & Brady LLP

(57) ABSTRACT

An example of a computer-readable medium to store machine-readable instructions. The instructions may cause a processor to update a machine learning model based on first confidential data set. The machine learning model may have been previously trained based on a training data set distinct from the confidential data set. The instructions may cause the processor to apply the machine learning model after the update to a second confidential data set.

19 Claims, 3 Drawing Sheets

300

- Tuning a machine learning model into a tuned machine learning model via a first processor based on a first data set, the machine-learning model being previously trained by a second processor based on a second data set, the first data set being distinct from the second data set — 310
- Applying the tuned machine learning model to a third data set to make a prediction — 320
- Causing a corrective action to be performed based on the prediction — 330

(56) References Cited

U.S. PATENT DOCUMENTS

| | | |
|---|---|---|
| 2017/0124487 A1 | 5/2017 | Szeto et al. |
| 2017/0372226 A1 | 12/2017 | Costa et al. |
| 2018/0060759 A1* | 3/2018 | Chu ...................... G06N 20/00 |
| 2018/0295154 A1* | 10/2018 | Crabtree ............. H04L 63/1433 |
| 2018/0331897 A1* | 11/2018 | Zhang .................... G06N 20/00 |
| 2019/0018985 A1* | 1/2019 | Rolle ...................... G06F 21/71 |

* cited by examiner

UPDATES OF MACHINE LEARNING MODELS BASED ON CONFIDENTIAL DATA

BACKGROUND

Machine learning models may be trained on data to detect patterns and make predictions. The data used to train machine learning models may be kept confidential by a corporate entity and not shared with other entities.

BRIEF DESCRIPTION OF THE DRAWINGS

Various examples will be described below referring to the following figures.

DETAILED DESCRIPTION

In preparing a machine learning model for use by customers, a vendor may use initial data to train the machine learning model. The initial data used to train the model may not be fully representative of a customer's circumstances. The customer may have confidential data that would be useful in developing the machine learning model, but the customer may be unwilling to share the confidential data with the vendor. If confidential data from both the customer and vendor were used to train the machine learning model, an improved machine learning model may result.

To address this problem, the vendor may perform an initial training of the machine learning model, which is to be provided to the customer. The customer may tune the machine learning model based upon the customer's confidential data. The tuned machine learning model may be applied to the customer's data to make predictions for the customer. The resulting tuned machine learning model is thus based on both the confidential data of the customer and the confidential data of the vendor, without either party disclosing the data to the other. Instead, the resulting machine learning model or predictions made by the machine learning model may be shared. This tuned machine learning model may better predict the operating circumstances of the customer.

Figure 1:
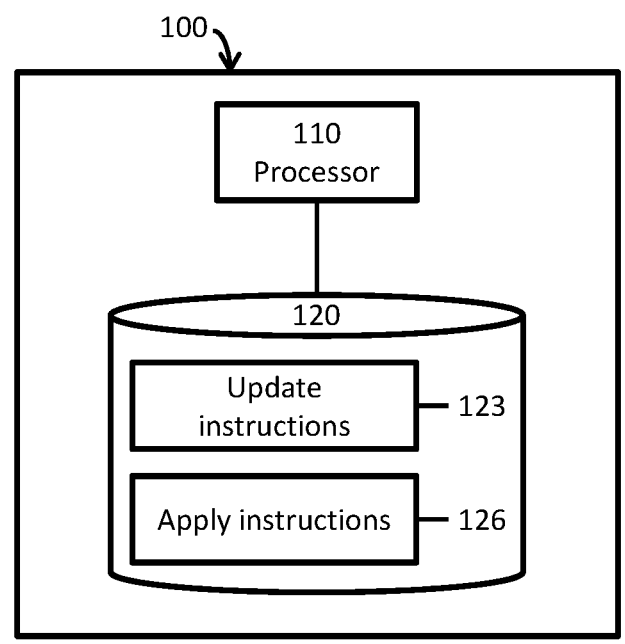
FIG. 1 shows a computer system to update and apply a machine learning model in accordance with various examples.

FIG. 1 shows a computer system 100 to update and apply a machine learning model in accordance with various examples. Computer system 100 includes a processor 110 and storage 120. Storage 120 stores update instructions 123 and apply instructions 126. Update instructions 123 and apply instructions 126 may be machine-readable instructions for execution by the processor 110. The update instructions 123 and apply instructions 126 may include instructions to implement the methods described herein, such as the methods described in connection with the other figures. The update instructions 123 may include instructions to update a machine learning model based on confidential data. The machine learning model may have been trained on a different computer system using a different data set. The confidential data may be used to tune the machine learning model. The apply instructions 126 may include instructions to apply the updated machine learning model to a data set.

The processor 110 may comprise a microprocessor, a microcomputer, a microcontroller, a field programmable gate array (FPGA), or discrete logic to execute machine-readable instructions. The storage 120 may include a hard drive, solid state drive (SSD), flash memory, electrically erasable programmable read-only memory (EEPROM), or random access memory (RAM). The processor 110 may be coupled to the storage 120, such as via a bus.

Figure 2:
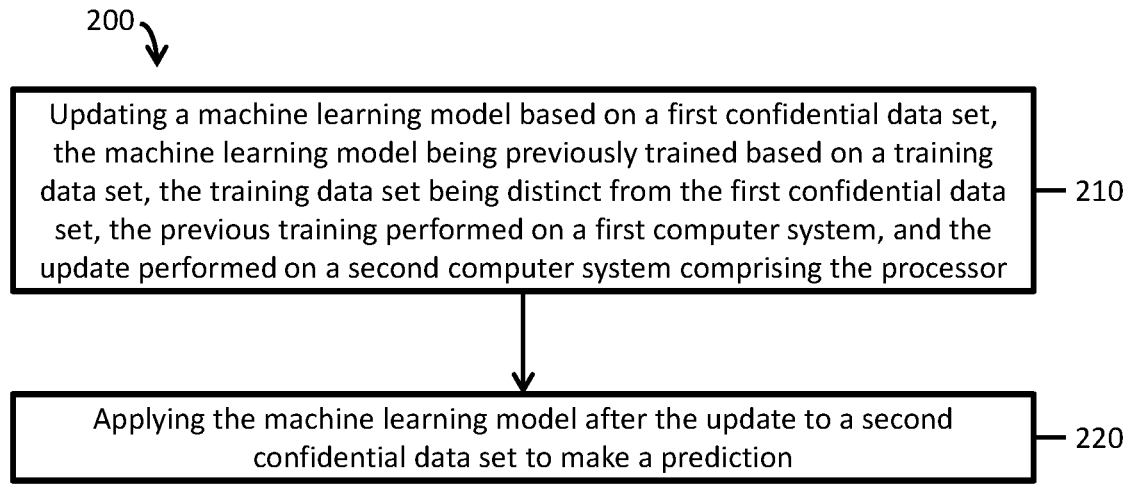
FIG. 2 shows a method of updating and applying a machine learning model in accordance with various examples.

FIG. 2 shows a method 200 of updating and applying a machine learning model in accordance with various examples. Method 200 includes updating a machine learning model based on a first confidential data set, the machine learning model being previously trained based on a training data set, the training data set being distinct from the first confidential data set, the previous training performed on a first computer system, and the update performed on a second computer system comprising the processor (210). Method 200 includes applying the machine learning model after the update to a second confidential data set to make a prediction (220).

A machine learning model is a mathematical model trained on historical data sets with varying levels of human involvement to allow for predictions based on other data sets. In various examples, the machine learning model may include nodes for performing mathematical operations on inputs. A node may accept members of a data set as an input. The node may accept outputs of other nodes, or even its own output, as an input. The node may include a math function that is applied over the received inputs to summarize the inputs as a value, and it may add non-linearity to the model. The node may include a weight, which may indicate an amount of impact that node has on the model. The nodes of the machine learning model may be grouped into layers, with data passing from one layer to the next. For example, one layer may be an input layer, receiving members of the data set, fixed values, or output of other machine learning models as inputs. One layer may be an output layer, providing some prediction, an answer to a question, or another output from the machine learning model. There may be intermediate layers between the input layer and the output layer.

In various examples, a machine learning model may be tuned after training on an initial data set. The initial training may be performed using one data set, while the tuning may be performed using a separate data set. After the initial training, certain nodes of the machine learning model may be frozen. Freezing the nodes may prevent the alteration of the operations performed by the nodes and any weight of the nodes. Other nodes may be modifiable by the tuning. The weights and other attributes of such nodes may be modified as the machine learning model is tuned. Links between nodes, such as passing the outputs of nodes to be the inputs of other nodes, may be modified by the tuning. Some links between nodes may be frozen and not modifiable by the tuning. Where the nodes are organized into layers, the layers may be frozen. For example, a machine learning model may include an input layer, an output layer, and an intermediate layer between the input layer and the output layer. After the machine learning model is initially trained, the input layer and intermediate layer may be frozen, and the output layer may be modifiable by the tuning.

In various examples, the machine learning model may be initially trained by one entity and then tuned by a second entity. This may be done where the entities have confidential data sets to use in training the machine learning model. After the initial training, nodes and links between the nodes may be frozen. The tuning may be performed on the modifiable nodes and links. For example, a vendor entity may provide support services for computer systems. The vendor may initially train a machine learning model based on a data set it has gathered across various customers. One customer may have policies that prevent sharing data about the customer's computer systems with the vendor. The customer may consider the data to be confidential. The vendor may initially train a machine learning model and provide the machine learning model to the customer. The customer may tune the machine learning model based on the customer's confidential data. The tuning may enable the machine learning model to more accurately predict issues with the customer's computer system. For example, the vendor's data used to initially train the machine learning model may include a mix of servers, laptops, and desktop computers from the top three computer manufacturers. The customer may not include any servers and include a different mix of laptops and desktop computers. The customer may have computer systems from a small computer manufacturer that is not represented in the vendor's data set. Tuning the machine learning model may result in different predictions based on the differences between the computer systems that created the vendor's data set and the computer systems in actual use by the customer. After the machine learning model is tuned, the customer may execute the machine learning model to provide predictions regarding the customer's computer systems. The predictions may be provided to the vendor to assist the vendor in servicing the customer's computer systems. The initial training of the machine learning model may be performed on a computer system under control of the vendor. The tuning of the machine learning model may be performed on a different computer system under control of the vendor. The customer's computer system may be used to apply the machine learning model to data sets used to make predictions about the customer's computer systems.

Confidential data includes restrictions about sharing the data. Data may be confidential for various reasons. Data may be confidential as it was generated internally to a company and the company considers the data to provide it some kind of benefit. For example, data gathered regarding a company's computer systems may be confidential as it indicates the model or brand of computer system the company tends to purchase. The data may be confidential as it indicates the applications used in developing a company's products or services. Data may be confidential due to a privacy aspect. For example, video data collected for facial recognition of employees may indicate the hours worked by the employees. The video data may be affected by laws or regulations regarding privacy of the employees. Data may be confidential due to a contract or a court order.

The data set used to initially train the machine learning model may be distinct from the data set used to tune the model. The data sets may be distinct, even if there is some overlap of the data, as the data sets may still be different. For example, tuning of the data set may include both confidential data as well as non-confidential data. A customer may share some data with a vendor, or the vendor may share some data with the customer. Both the customer and the vendor may include that data in the data sets used to train and to tune the machine learning model.

In various examples, the machine learning model may be transferred between computer systems after the machine learning model has been initially trained and before the machine learning model is tuned. This transfer may be via a network connection, such as via Bluetooth or over the Internet. The network connection may be via a secure connection. The connection may be made secure in various ways, such as use of a password or personal identification number (PIN), use of a physical object such as a magnetic card, sending credentials to a specified cell phone number, use of biometrics, encrypting of the data stream, or limiting connections to a set of specified network addresses. The transfer may be via a removable computer-readable medium. A removable computer-readable medium allows for removal of the storage medium without powering down the computer system. For example, a universal serial bus (USB) memory stick is a removable computer-readable medium. Removable computer-readable medium may include media such as an optical disk, magnetic tape, or a secure digital (SD) card.

In various examples, a new machine learning model may be initially trained and provided to customers for tuning. The customer may compare predictions by the new machine learning model against predictions by the previous tuned machine learning model and determine whether or not to update to the new machine learning model. The customer may tune the new machine learning model before making such a comparison. For example, a new machine learning model regarding maintenance of computer systems may be trained to include information for newer computer systems sold by manufacturers. Depending on whether the customer uses newer or older computer systems, the new machine learning model may make more accurate predictions than the older machine learning model.

Figure 3:
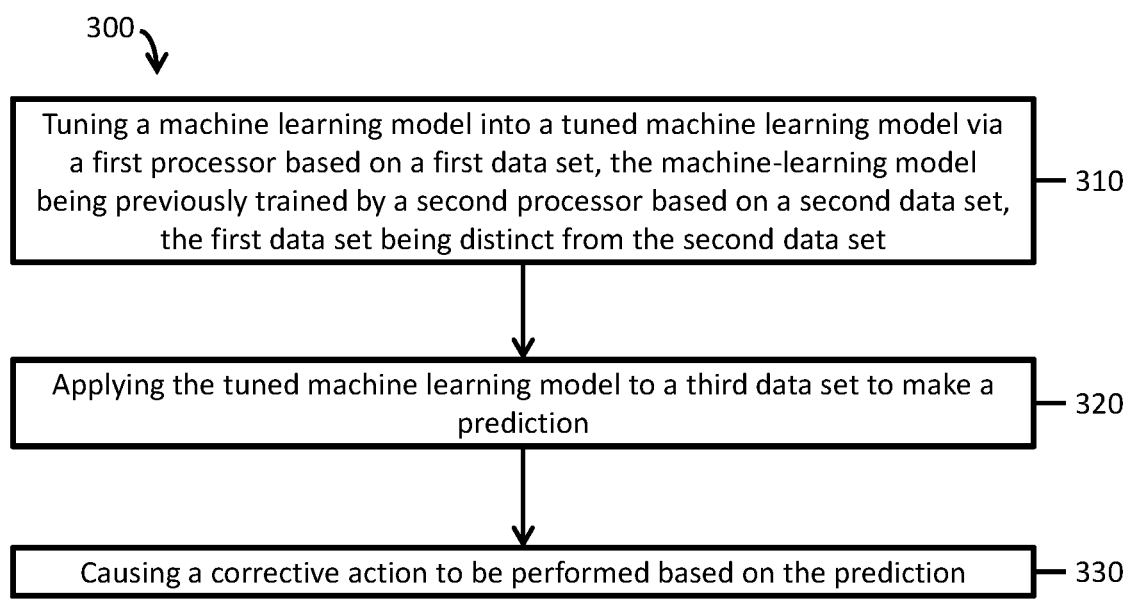
FIG. 3 shows a method of tuning a machine learning model in accordance with various examples.

FIG. 3 shows a method 300 of tuning a machine learning model in accordance with various examples. Method 300 includes tuning a machine learning model into a tuned machine learning model via a first processor based on a first data set, the machine-learning model being previously trained by a second processor based on a second data set, the first data set being distinct from the second data set (310). Method 300 includes applying the tuned machine learning model to a third data set to make a prediction (320). Method 300 includes causing a corrective action to be performed based on the prediction (330).

A corrective action may be an action to be taken due to an issue identified by the machine learning model. For example, the machine learning model may predict hard drive failures based on data collected from hard drives. The corrective action may be replacement of a hard drive that is showing signs of imminent failure.

In various examples, a corrective action may include maintenance of a computer system. The maintenance may include replacement or repair of a component of the computer system. The maintenance may include running diagnostics on the computer system or modifying the settings of the operating system or applications installed on the computer system.

In various examples the data set used to initially train the machine learning model may be non-overlapping with the data set used to tune the machine learning model. For example, the data sets may be collected by two entities from different sets of devices. The two entities may not share data from the data sets with the other. This may, for example, occur when both entities consider their data sets to be confidential.

Figure 4:
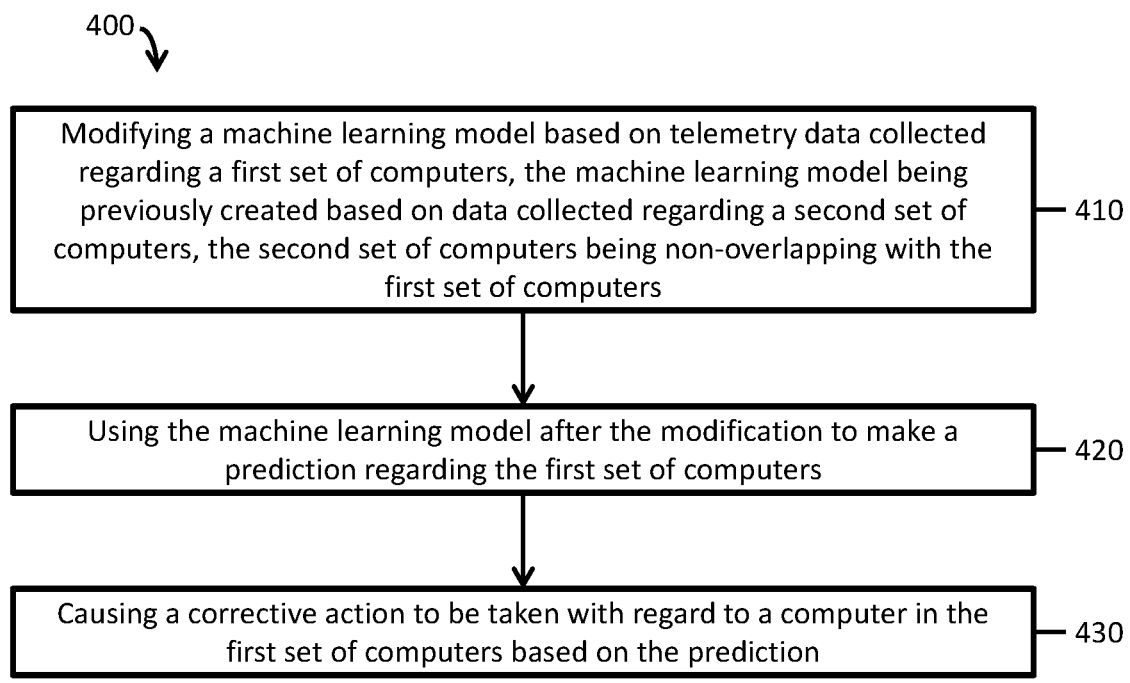
FIG. 4 shows a method of modifying a machine learning model based on telemetry data in accordance with various examples.

FIG. 4 shows a method 400 of modifying a machine learning model based on telemetry data in accordance with various examples. Method 400 includes modifying a machine learning model based on telemetry data collected regarding a first set of computers, the machine learning model being previously created based on data collected regarding a second set of computers, the second set of computers being non-overlapping with the first set of computers (410). Method 400 includes using the machine learning model after the modification to make a prediction regarding the first set of computers (420). Method 400 includes causing a corrective action to be taken with regard to a computer in the first set of computers based on the prediction (430).

In various examples, the machine learning model may be used to support or maintain a set of computer systems. Telemetry data may be collected regarding those computers. The telemetry data may include model and manufacturer information, versions of the operating system and applications installed on the computer system, and measurements of components of the computer system, such as processor utilization, processor temperature, fan speed, storage data, and battery data. The battery data may include information about a charge and temperature of the battery. Based on the telemetry data, the machine learning model may make a prediction regarding the battery of a specific computer system. Based on the prediction, a corrective action may include replacement of the battery. The storage data may include information about a temperature, capacity, unused capacity, and age of the storage. Based on the telemetry data, the machine learning model may make a prediction regarding the storage of a specific computer system. Based on the prediction, a corrective action may include replacement of the storage.

In various examples, the computer system tuning and applying the machine learning model may be a secured computer system, due to its use of confidential data. The secured computer system may be connected to a network, but limit its communications to a known set of network addresses. The set of network addresses may be stored in boot-level memory coupled to the processor. For example, they may be stored on an EEPROM on a motherboard of the computer system. When a new machine learning model is available, the secured computer system may retrieve the new machine learning model from one of the allowed network address locations.

Allowing an initial training of the machine learning model, followed by tuning on a separate data set, allows an entity to maintain the confidentiality of its data. The entity may also receive the benefit of training using a large data set and also receive the benefit of tuning based on data specific to the entity. For example, an entity may not have enough confidential data to perform adequate training of a machine learning model, but it may be sufficient for tuning a trained machine learning model. Different entities may thus preserve their sets of confidential data, but still benefit from a machine learning model trained and updated using both sets of data. Thus, benefits comparable to sharing of the confidential data may be achieved while still preserving full confidentiality.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A non-transitory computer-readable medium to store machine-readable instructions that, when executed by a processor, cause the processor to:
update a machine learning model based on a first confidential data set, wherein the machine learning model comprises a first set of nodes with frozen weights and a second set of nodes with modifiable weights, and wherein the updating comprises modifying the modifiable weights of the second set of nodes, and wherein the machine learning model has been previously trained based on a training data set, the training data set being distinct from the first confidential data set, the previous training performed on a first computer system, the first confidential data set restricted from sharing with the first computer system, and the update performed on a second computer system comprising the processor;
apply the machine learning model after the update to a second confidential data set to make a prediction; and
cause a corrective action to be taken based on the prediction.

2. The computer-readable medium of claim 1, wherein execution of the machine-readable instructions by the processor causes the processor to:
create a second updated model based on the machine learning model after the update and based on the second confidential data set; and
replace the machine learning model with the second updated model.

3. The computer-readable medium of claim 1, wherein the machine learning model includes an input layer, an intermediate layer, and an output layer, and wherein the machine learning model after the update includes the input layer, the intermediate layer, and an updated output layer, the updated output layer based on the output layer and the first confidential data set.

4. The computer-readable medium of claim 1, wherein execution of the machine-readable instructions by the processor causes the processor to cause repair of a device based on the prediction, the device being a source of the second confidential data set.

5. The computer-readable medium of claim 1, wherein execution of the machine-readable instructions by the processor causes the processor to:
receive a new machine learning model via a removable computer-readable medium, the new machine learning model being previously trained based on a second training data set;
replace the machine learning model with the new machine learning model; and
update the new machine learning model based on a third confidential data set.

6. The computer-readable medium of claim 1, wherein execution of the machine-readable instructions by the processor causes the processor to update the machine learning model based on the first confidential data set and a first non-confidential data set.

7. A method comprising:
tuning a machine learning model into a tuned machine learning model via a first processor based on a first data set, the machine-learning model being previously trained by a second processor based on a second data set, the first data set being distinct from the second data set, wherein the machine learning model comprises a first set of nodes with frozen weights and a second set of nodes with modifiable weights, and wherein the tuning comprises modifying the modifiable weights of the second set of nodes;
applying the tuned machine learning model to a third data set to make a prediction; and
causing a corrective action to be performed based on the prediction.

8. The method of claim 7, wherein the first data set is non-overlapping with the second data set.

9. The method of claim 7, wherein the second data set includes data regarding a first computer system and a second computer system, and the corrective action regarding the first computer system.

10. The method of claim 9, wherein the corrective action includes replacement of a component of the first computer system.

11. The method of claim 7, wherein the first set of nodes with frozen weights are organized into a frozen layer in which modification of the frozen layer through the tuning of the machine learning model is prevented.

12. The method of claim 7, wherein the machine learning model includes an input layer, an intermediate layer, and an output layer, wherein the input layer and the intermediate layer are frozen layers, wherein the first set of nodes with frozen weights are included in the input layer or the intermediate layer, and the output layer includes the second set of nodes with the modifiable weights.

13. The method of claim 7, wherein the first data set comprises confidential data that is associated with restrictions that restrict sharing with the second processor.

14. A non-transitory computer-readable medium to store machine-readable instructions that, when executed by a processor, cause the processor to:
modify a machine learning model based on telemetry data collected regarding a first set of computers, wherein the machine learning model comprises a first set of nodes with frozen weights and a second set of nodes with modifiable weights, and wherein, to modify the machine learning model based on the telemetry data, the processor is to modify the modifiable weights of the second set of nodes, the machine learning model being previously created based on data collected regarding a second set of computers, wherein the telemetry data includes confidential data that is restricted from sharing with the second set of computers, the second set of computers being nonoverlapping with the first set of computers;
use the machine learning model after the modification to make a prediction regarding the first set of computers; and
cause a corrective action to be taken with regard to a computer in the first set of computers based on the prediction.

15. The computer-readable medium of claim 14, wherein the telemetry data includes data regarding a storage of the computer.

16. The computer-readable medium of claim 15, wherein the corrective action includes replacing the storage of the computer.

17. The computer-readable medium of claim 14, wherein the processor is coupled to a network, and wherein communication of the processor with the network is limited to communication with a set of network addresses, the set of network addresses being stored in a boot-level memory coupled to the processor.

18. The computer-readable medium of claim 17, wherein execution of the machine-readable instructions by the processor causes the processor to:
receive a new machine learning model via a network address in the set of network addresses;
replace the machine learning model with the new machine learning model; and
modify the new machine learning model based on the telemetry data.

19. The computer-readable medium of claim 14, wherein the telemetry data includes data regarding at least one of: a model, a manufacturer, or a version of an operating system of the computer.

* * * * *